(12) United States Patent
Oda et al.

(10) Patent No.: US 11,087,941 B2
(45) Date of Patent: Aug. 10, 2021

(54) ELECTRICAL JUNCTION BOX

(71) Applicant: Sumitomo Wiring Systems, Ltd., Mie (JP)

(72) Inventors: Maiko Oda, Mie (JP); Takumi Ejima, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 58 days.

(21) Appl. No.: 16/585,405

(22) Filed: Sep. 27, 2019

(65) Prior Publication Data
US 2020/0118778 A1 Apr. 16, 2020

(30) Foreign Application Priority Data

Oct. 12, 2018 (JP) .............................. JP2018-193800

(51) Int. Cl.
| | |
|---|---|
| *H01H 45/04* | (2006.01) |
| *H02G 3/08* | (2006.01) |
| *H01H 45/14* | (2006.01) |
| *B60R 16/023* | (2006.01) |

(52) U.S. Cl.
CPC ............ *H01H 45/04* (2013.01); *H01H 45/14* (2013.01); *H02G 3/081* (2013.01); *B60R 16/0238* (2013.01)

(58) Field of Classification Search
None
See application file for complete search history.

(56) References Cited

U.S. PATENT DOCUMENTS

| | | | | | |
|---|---|---|---|---|---|
| 1,594,699 | A | * | 8/1926 | Thomas | H05K 7/06 455/349 |
| 1,675,219 | A | * | 6/1928 | Kent, Jr. | H02G 3/081 220/3.94 |
| 2,043,532 | A | * | 6/1936 | Dubilier | H01G 4/38 361/329 |
| 3,060,310 | A | * | 10/1962 | Bertsche, Jr. | H01R 33/0845 362/221 |
| 3,295,093 | A | * | 12/1966 | Neumann | H01R 25/14 439/118 |
| 3,472,945 | A | * | 10/1969 | Trachtenberg | H02G 3/081 174/53 |

(Continued)

FOREIGN PATENT DOCUMENTS

JP 2018-126040 A 8/2018

OTHER PUBLICATIONS

JP_2018_126040_Description_Translation_JPApplication2017_018983. Yazaki. "Electrical connection box for a vehicle." 2017. JPO. (Year: 2018).*

(Continued)

*Primary Examiner* — Timothy J. Dole
*Assistant Examiner* — Muhammed Azam
(74) *Attorney, Agent, or Firm* — Honigman LLP

(57) ABSTRACT

An electrical junction box includes a container and a relay that is installed on an outer surface of the container. A busbar protrudes from the outer surface of the container and is connected to the relay. A support wall protrudes from the outer surface of the container, is provided opposite to the busbar, and supports the relay. The relay is interposed between the busbar and the support wall, and the busbar has a guide portion configured to guide insertion of the relay between the busbar and the support wall.

10 Claims, 7 Drawing Sheets

(56) References Cited

U.S. PATENT DOCUMENTS

| | | | | |
|---|---|---|---|---|
| 4,703,397 A * | 10/1987 | Minoura | ............ | B60R 16/0239 |
| | | | | 361/752 |
| 5,299,112 A * | 3/1994 | Nivette, Jr. | ............ | F21V 21/34 |
| | | | | 211/206 |
| 5,353,190 A * | 10/1994 | Nakayama | ............ | B60K 37/00 |
| | | | | 361/647 |
| 5,758,931 A * | 6/1998 | Hio | ............ | B60R 16/0238 |
| | | | | 303/113.1 |
| 5,761,047 A * | 6/1998 | Settles | ............ | H05K 5/0069 |
| | | | | 174/541 |
| 5,816,850 A * | 10/1998 | Yamada | ............ | H01H 9/085 |
| | | | | 439/507 |
| 5,823,819 A * | 10/1998 | Kondo | ............ | H01R 9/2458 |
| | | | | 439/487 |
| 5,864,091 A * | 1/1999 | Sumida | ............ | H02G 3/088 |
| | | | | 174/50 |
| 5,995,380 A * | 11/1999 | Maue | ............ | B60R 16/0238 |
| | | | | 174/254 |
| 7,070,221 B2 * | 7/2006 | Cowelchuk | ............ | B60N 2/78 |
| | | | | 296/39.1 |
| 7,414,204 B2 * | 8/2008 | Ahn | ............ | H05K 7/20963 |
| | | | | 174/541 |
| 8,508,917 B2 * | 8/2013 | Rus | ............ | H01H 9/042 |
| | | | | 174/50.51 |
| 2003/0157821 A1 * | 8/2003 | Onizuka | ............ | H05K 7/026 |
| | | | | 439/188 |
| 2009/0056971 A1 * | 3/2009 | Pyron | ............ | H02G 3/06 |
| | | | | 174/68.1 |
| 2009/0200298 A1 * | 8/2009 | Nakayama | ............ | H02G 3/081 |
| | | | | 220/3.8 |
| 2011/0174514 A1 * | 7/2011 | Orihara | ............ | H02G 3/081 |
| | | | | 174/50 |
| 2013/0062937 A1 * | 3/2013 | Fussl | ............ | B60R 16/02 |
| | | | | 307/9.1 |
| 2015/0282363 A1 * | 10/2015 | Bier | ............ | H02B 1/38 |
| | | | | 174/50.52 |
| 2016/0295714 A1 * | 10/2016 | Taniguchi | ............ | H01R 13/52 |
| 2016/0308341 A1 * | 10/2016 | Doi | ............ | H02G 3/083 |
| 2017/0359093 A1 * | 12/2017 | Ikeda | ............ | H04B 1/082 |
| 2018/0278034 A1 * | 9/2018 | Chin | ............ | B60R 16/0238 |
| 2019/0067921 A1 * | 2/2019 | Nagano | ............ | H02G 5/10 |
| 2019/0318892 A1 * | 10/2019 | Ikejiri | ............ | H01M 10/625 |
| 2020/0067294 A1 * | 2/2020 | Oda | ............ | H02G 3/14 |
| 2020/0238930 A1 * | 7/2020 | Yamanaka | ............ | H02B 1/46 |

OTHER PUBLICATIONS 2017-018983_2018-126040_inquiry_of_history_information. J-Plat-Pat. (Year: 2020).*

* cited by examiner

ELECTRICAL JUNCTION BOX

CROSS-REFERENCE TO RELATED APPLICATIONS

This application claims priority of Japanese Patent Application No. JP 2018-193800 filed on Oct. 12, 2018, the contents of which are incorporated herein.

TECHNICAL FIELD

The present disclosure relates to an electrical junction box.

BACKGROUND

Vehicles are provided with electrical junction boxes used to connect a plurality of on-board loads to an on-board power supply (see, e.g. JP 2018-126040A). On-board loads refer to on-board devices such as lamps, windshield wipers, and a motor.

The electrical junction box disclosed in JP 2018-126040A includes a lower case (lower cover) with an opening, and an upper case (upper cover) that is attached to the lower case from the opening side. A relay is fixed to an outer surface of the upper case. One end portion of a plate-shaped busbar protrudes from the outer surface of the upper case, and a support wall (wall portion) that supports the relay is provided standing on the outer surface of the upper case at a position opposite to the one end portion of the busbar. The relay is interposed between the support wall and the one end portion of the busbar.

The one end portion of the busbar is fixed to the relay by, for example, screwing a screw. Furthermore, another end portion of the busbar is fixed to the upper case and the like by, for example, screwing a screw. The relay and the busbar are fixed to each other by, for example, after the fixation of the other end portion of the busbar using a screw, inserting the relay into a space between the one end portion of the busbar and the support wall, and fixing the one end portion of the busbar to the relay using a screw.

Meanwhile, the distance between the support wall and the one end portion of the busbar, that is, the length of the space into which the relay is to be inserted varies depending on the fixation state of the busbar, and thus, if the fixation state is inappropriate, a problem may occur in inserting and fixing the relay, resulting in such a situation where the relay cannot be easily installed.

It is an object of the present disclosure to provide an electrical junction box in which a relay can be easily installed.

SUMMARY

According to an aspect of the present disclosure, an electrical junction box includes: a container; a relay that is installed on an outer surface of the container; a busbar that protrudes from the outer surface of the container, and is connected to the relay; and a support wall that protrudes from the outer surface of the container, is provided opposite to the busbar, and supports the relay, wherein the relay is interposed between the busbar and the support wall, and the busbar has a guide portion configured to guide insertion of the relay between the busbar and the support wall.

Advantageous Effects of Disclosure

According to the above-described configuration, a relay can be easily installed.

DETAILED DESCRIPTION OF PREFERRED EMBODIMENTS

Embodiments of the present disclosure will be described in order. Also, at least part of the embodiments described below may also be suitably combined with each other.

An electrical junction box according to an aspect of the present disclosure includes: a container; a relay that is installed on the outer surface of the container; a busbar that protrudes from the outer surface of the container, and is connected to the relay; and a support wall that protrudes from the outer surface of the container, is provided opposite to the busbar, and supports the relay. The relay is interposed between the busbar and the support wall, and the busbar has a guide portion that guides insertion of the relay between the busbar and the support wall.

With this aspect, when the relay is inserted between the support wall and the busbar, the guide portion can guide the insertion of the relay. Accordingly, the relay can be easily installed.

In the electrical junction box according to an aspect of the present disclosure, the guide portion is a curved surface formed by curving a protruding end of the busbar to the side opposite to the support wall.

With this aspect, the curved surface formed at the protruding end of the busbar can guide insertion of the relay.

In the electrical junction box according to the present disclosure, the guide portion is an inclined surface that is formed at a protruding end of the busbar, and is inclined such that a distance to the support wall increases toward the protruding end.

With this aspect, the inclined surface formed at the protruding end of the busbar can guide insertion of the relay.

In the electrical junction box according to an aspect of the present disclosure, the busbar includes a body portion that is elongated in one direction, and is located inside the container, and a protruding portion that is contiguous with one end portion of the body portion, and protrudes from the container. Another end portion of the body portion has an elongated hole that is elongated in the one direction.

With this aspect, since the elongated hole is elongated along the body portion, screwing a screw in the elongated hole is possible reflecting the position of the body portion, which is determined first by screwing the busbar and the relay to each other. Accordingly, it is possible to fix the busbar to match to the size of the relay, making it possible to install the relay more easily.

In the electrical junction box according to an aspect of the present disclosure, the busbar has a thickness of 1 mm or more.

With this aspect, it is possible to reduce the resistance value of a current flowing through the busbar.

Hereinafter, embodiments of the present disclosure will be described in detail with reference to the drawings.

Figure 1:
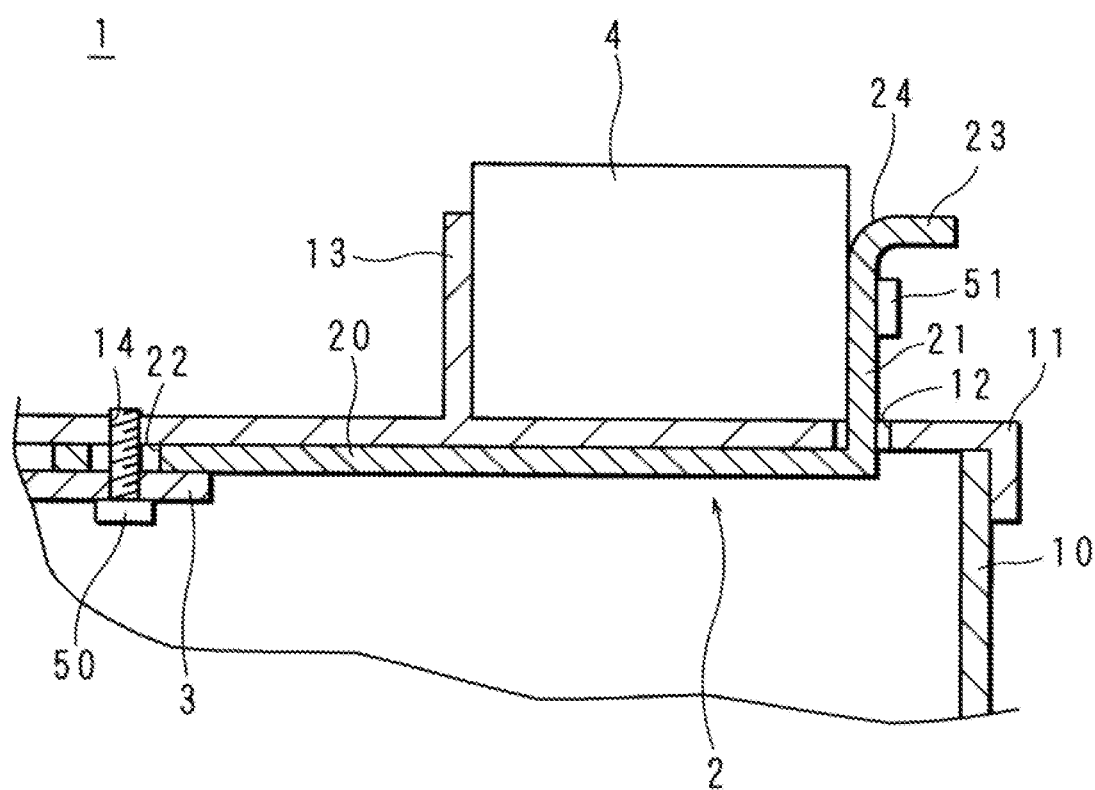
FIG. 1 is a schematic cross-sectional view of a main portion of an electrical junction box according to Embodiment 1.

FIG. 1 is a schematic cross-sectional view of a main portion of an electrical junction box according to Embodiment 1. An electrical junction box 1 is used to connect an on-board load such as a lamp, a windshield wiper, or a motor to an on-board power supply. The electrical junction box 1 is provided with a rectangular box-shaped lower case 10 with an opening on the upper side, and an upper case 11 that is attached to the lower case 10 so as to close the opening.

The electrical junction box 1 is installed in an vehicle in a state in which, for example, the upper case 11 is located on the upper side. Note that the installation state is not limited to the state in which the upper case 11 is located on the upper side, and the electrical junction box 1 may also be installed in, for example, another state of being inclined or laid sideways, according to the design of the vehicle or the like.

The electrical junction box 1 houses busbars 2 and 3, which are plate-shaped conductive members. The thickness of the busbars 2 and 3 is preferably 1 mm or more. With this measure, a larger current can flow through the busbars 2 and 3. Also, the thickness of the busbars 2 and 3 is preferably 2 mm or less. With this measure, the busbars 2 and 3 are not excessively large, and downsizing of the electrical junction box 1 can be achieved.

A relay 4 in the shape of a rectangular parallelepiped is installed on the upper surface of the upper case 11 of the electrical junction box 1. The relay 4 is, for example, a mechanical relay, and houses members such as a coil and a spring. The relay 4 is switched on and off to control a current flowing through the busbar 2, based on a signal that corresponds to the state of each member of the vehicle. Specifically, the relay 4, to which a not-shown busbar is further connected, is switched on and off to control a current flowing through this busbar and the busbar 2.

Figure 2:
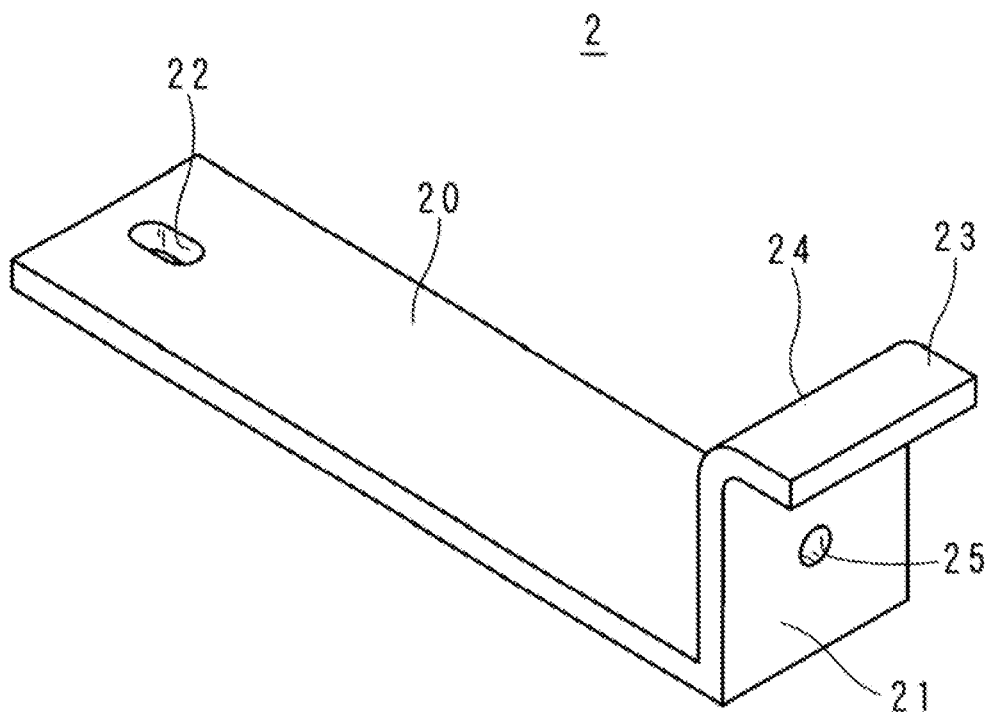
FIG. 2 is a perspective view of a busbar.

FIG. 2 is a perspective view of the busbar 2. The busbar 2 includes a rectangular body portion 20, and a connecting portion 21 that is contiguous from one end portion of the body portion 20 at a substantially right angle. Another end portion of the body portion 20 has an elongated hole 22. The elongated hole 22 has the shape of an elongated circle that is elongated in the length direction of the body portion 20. A protruding end 23 of the connecting portion 21 is curved to the side opposite to the body portion 20, and a curved surface 24 is formed on the body portion 20 side. Furthermore, the connecting portion 21 has a hole 25 that penetrates therethrough and through which a later-described screw is to be inserted.

The upper case 11 has an insertion hole 12 that penetrates therethrough in the thickness direction, and through which the connecting portion 21 of the busbar 2 is inserted. The size, in the length direction, of the insertion hole 12 is greater than the thickness of the busbar 2. The body portion 20 of the busbar 2 is arranged on the back side of the upper case 11, and the connecting portion 21 protrudes substantially perpendicularly from the outer surface of the upper case 11. A support wall 13 is provided standing on the outer surface of the upper case 11, while extending along the insertion hole 12 with a predetermined distance therefrom. The support wall 13 is provided to be opposite to the connecting portion 21 of the busbar 2 inserted into and passed through the insertion hole 12. The protruding end 23 of the busbar 2 is located on the side opposite to the support wall 13.

The relay 4 is inserted between the support wall 13 and the connecting portion 21 of the busbar 2, and the connecting portion 21 is screwed to the relay 4 with a screw 51. The screw 51 is passed through the hole 25, and engages with a screw hole (not shown) formed in the relay 4. By screwing the screw 51, the relay 4 and the busbar 2 are fixed so as to abut against each other. As a result of one side of the connecting portion 21 coming into contact with the relay 4, the relay 4 and the busbar 2 are electrically connected to each other.

The busbar 3 is plate-shaped, and is arranged so as to overlap the other end portion of the body portion 20 of the busbar 2 from below. The upper case 11 has a screw hole 14 at a position that corresponds to the elongated hole 22 of the busbar 2. The busbar 2 is screwed, together with the busbar 3, with a screw 50 in the elongated hole 22 being screwed into the screw hole 14 of the upper case 11. The elongated hole 22 has a size in the longitudinal direction that is greater than the corresponding size of the shaft portion of the screw 50, and is formed as a so-called clearance hole. Furthermore, the elongated hole 22 has a width that is smaller than that of the head of the screw 50.

Figure 3:
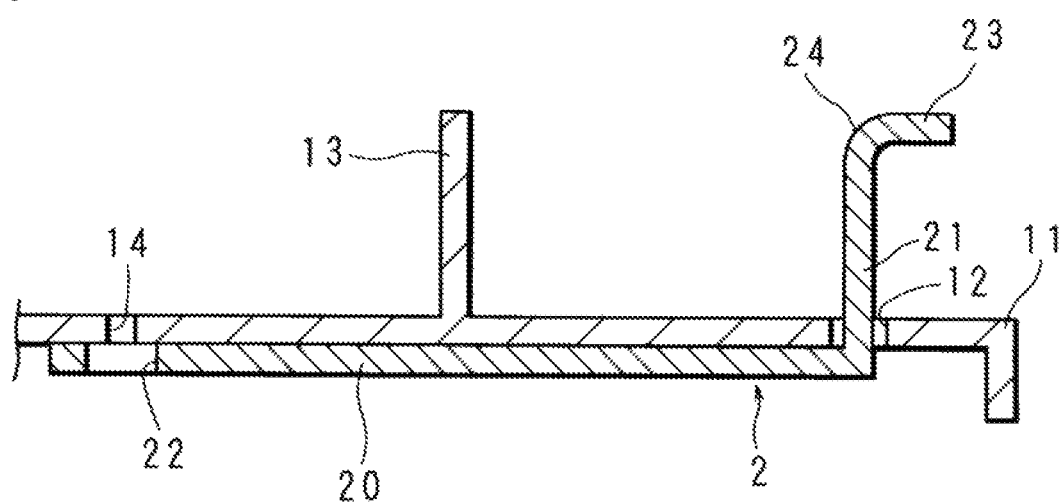
FIG. 3 is a schematic cross-sectional view showing a procedure of installing a relay.
Figure 4:
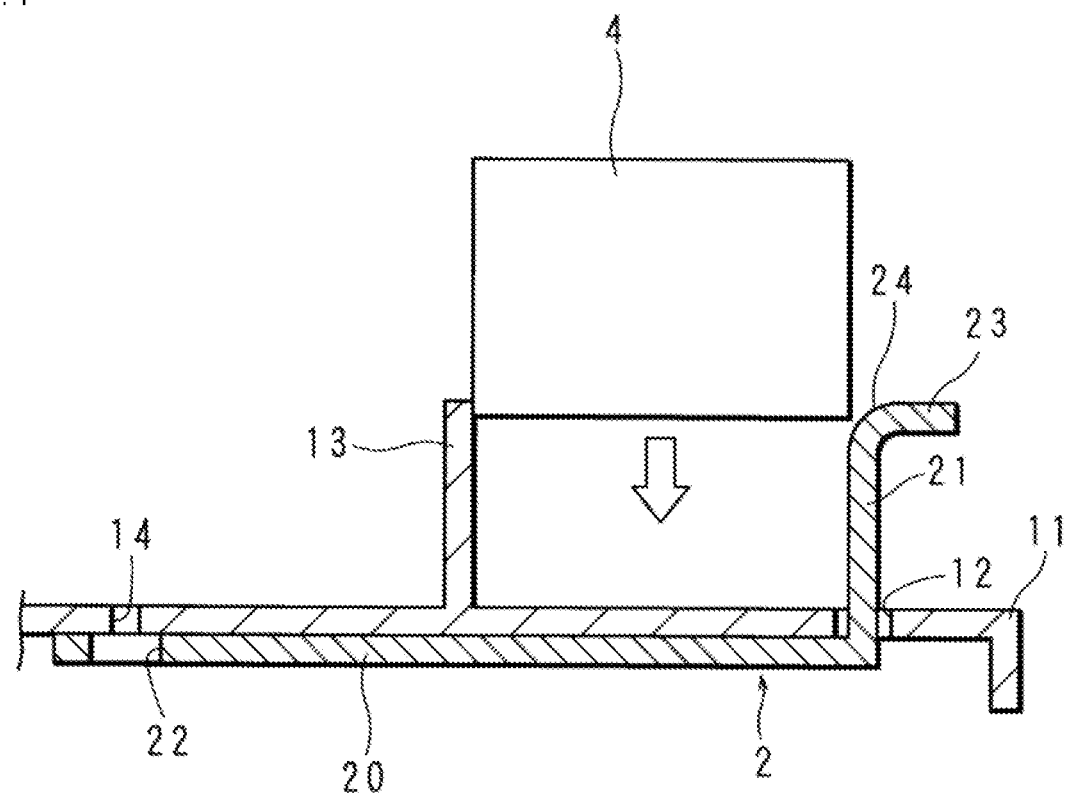
FIG. 4 is a schematic cross-sectional view showing the procedure of installing the relay.
Figure 5:
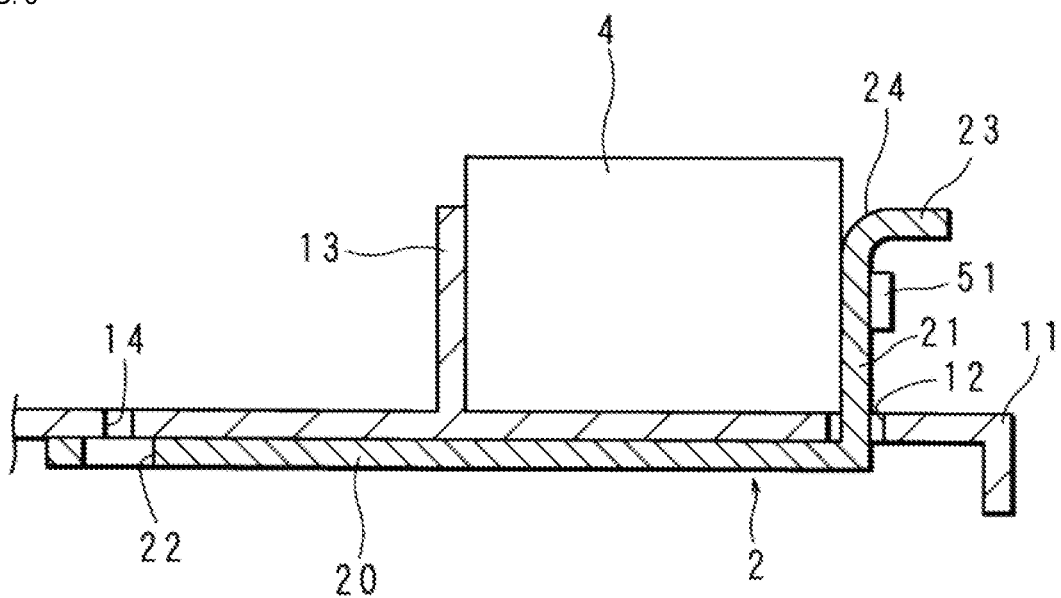
FIG. 5 is a schematic cross-sectional view showing the procedure of installing the relay.

FIGS. 3 to 5 are schematic cross-sectional views showing a procedure of installing the relay 4. First, as shown in FIG. 3, the connecting portion 21 of the busbar 2 is inserted through the insertion hole 12 of the upper case 11. At this time, the elongated hole 22 and the screw hole 14 may also be temporarily fixed to each other.

Then, as shown in FIG. 4, the relay 4 is inserted between the support wall 13 and the connecting portion 21 of the busbar 2 in the direction of the white arrow. At this time, corner portions of the relay 4 are guided by the curved surface 24 of the busbar 2, and thus the relay 4 can be inserted smoothly. Here, since the elongated hole 22 is elongated in the length direction of the body portion 20, and the size, in the length direction, of the insertion hole 12 is greater than the thickness of the busbar, even if the distance between the support wall 13 and the connecting portion 21 is smaller than the relay 4, the busbar 2 will move to match to the outer size of the relay 4, and the relay 4 can thus be easily inserted. Furthermore, the elongated hole 22 is elongated in the length direction of the body portion 20, and thus, even if the busbar 2 moves in the length direction, the elongated hole 22 overlaps the screw hole 14.

Then, as shown in FIG. 5, by fixing the relay 4 and the connecting portion 21 using the screw 51, the relay 4 is interposed between the support wall 13 and the connecting portion 21, is fixed to the upper case 11, and is thus installed. Here, if the relay 4 and the connecting portion 21 are located apart from each other, screwing will bring the connecting portion 21 into contact with the relay 4. Accordingly, it is possible to prevent an increase in the resistance that may be caused by a reduced contact area between the relay 4 and the connecting portion 21.

By screwing the other end portion of the busbar 2, together with the busbar 3, using the screw 50 in the elongated hole 22 into the screw hole 14 of the upper case 11, the busbar 2 is fixed to the upper case 11. Then, by covering the lower case 10 with the upper case 11, the electrical junction box 1 is assembled.

With the above-described configuration, the curved surface 24 can guide insertion of the relay 4 between the connecting portion 21 of the busbar 2 and the support wall 13. Therefore, the relay 4 can be easily installed in the electrical junction box 1.

Furthermore, since the elongated hole 22 is elongated along the body portion 20, even if, first, the busbar 2 and the relay 4 are screwed, and then the busbar 2 and the relay 4 are positioned, the elongated hole 22 and the screw hole 14 overlap each other when the body portion 20 moves in response to the positioning. Therefore, screwing a screw in the elongated hole 22 is possible reflecting the position of the body portion 20. Accordingly, it is possible to fix the busbar 2 to a predetermined position according to the size of the relay 4, making it possible to install the relay 4 more easily.

Note that the support wall 13 may also be formed so as to enclose three sides of the relay 4 excluding one side that faces the busbar 2.

Embodiment 2

The electrical junction box 1 according to Embodiment 2 differs from the electrical junction box according to Embodiment 1 in the shape of the busbar 2. The same reference numerals are given to the same configurations of the electrical junction box 1 according to Embodiment 2 as those of Embodiment 1 and detailed description thereof is omitted.

Figure 6:
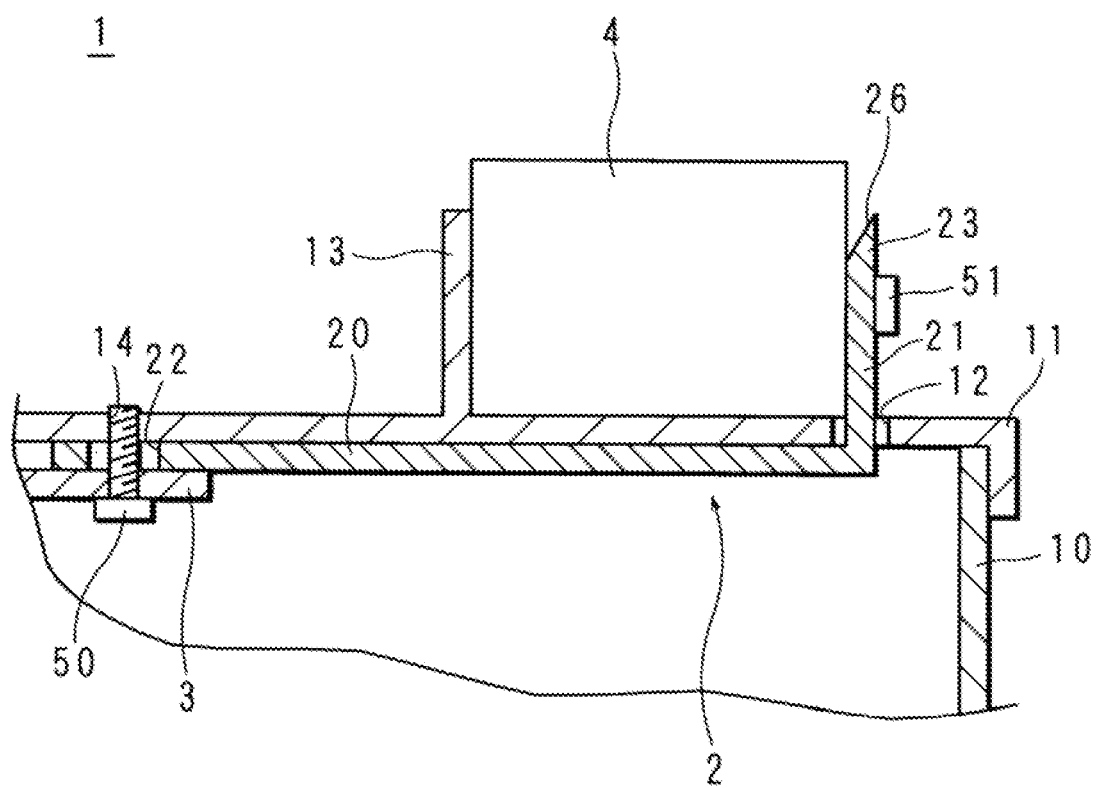
FIG. 6 is a schematic cross-sectional view of a main portion of an electrical junction box according to Embodiment 2.

FIG. 6 is a schematic cross-sectional view of a main portion of the electrical junction box 1 according to Embodiment 2. In Embodiment 2, the protruding end 23 of the connecting portion 21 of the busbar 2 is not curved but tapered to the protruding end side, and the protruding end 23 has an inclined surface 26 that is inclined from the body portion 20 side to the opposite side. The inclined surface 26 is inclined such that the distance to the support wall 13 increases toward the protruding end.

With the above-described configuration, when the relay 4 is inserted between the support wall 13 and the connecting portion 21 of the busbar 2, corner portions of the relay 4 are guided by the inclined surface 26 of the busbar 2, and thus the relay 4 can be easily inserted. Accordingly, similar to Embodiment 1, the relay 4 can be easily installed in the electrical junction box 1.

Embodiment 3

The electrical junction box 1 according to Embodiment 3 differs from the electrical junction boxes according to Embodiments 1 and 2 in the shape of the busbar 2. The same reference numerals are given to the same configurations of the electrical junction box 1 according to Embodiment 3 as those of Embodiment 1 and detailed description thereof is omitted.

Figure 7:
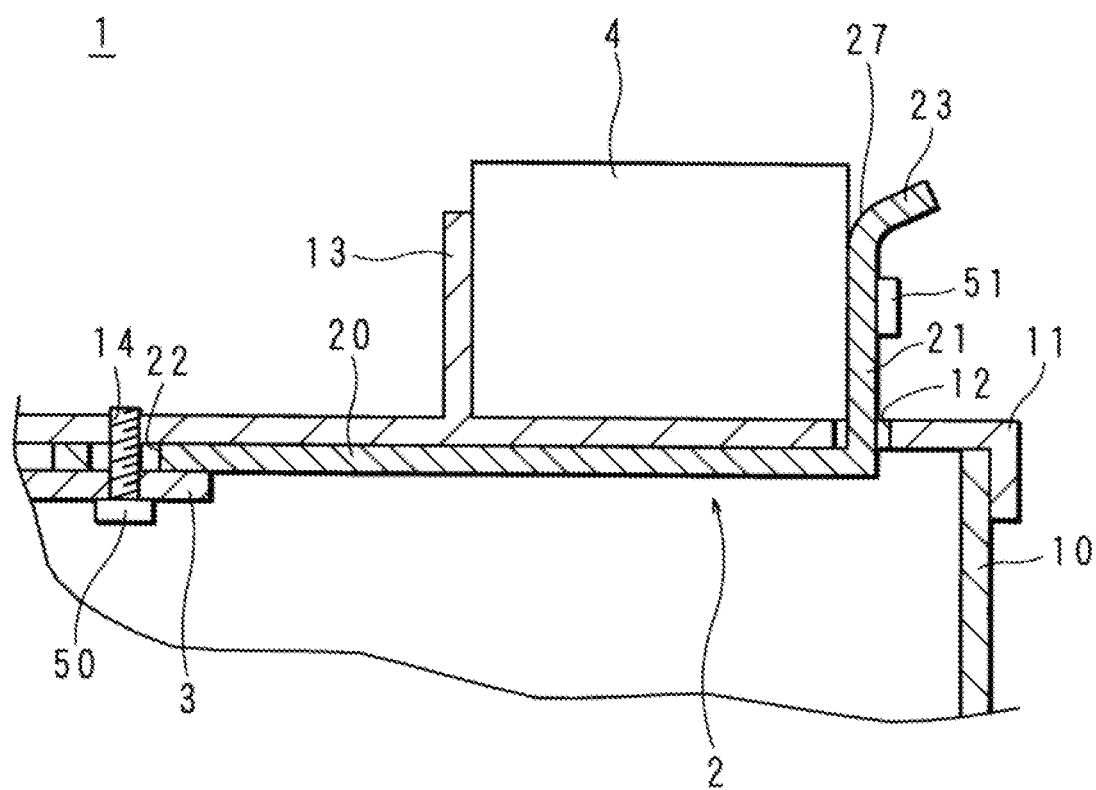
FIG. 7 is a schematic cross-sectional view of a main portion of an electrical junction box according to Embodiment 3.

FIG. 7 is a schematic cross-sectional view of a main portion of the electrical junction box 1 according to Embodiment 3. In Embodiment 3, the protruding end 23 of the busbar 2 is curved to the side opposite to the body portion 20 so as to form an acute angle with respect to the protruding direction. Therefore, a curved surface 27 is formed on the body portion 20 side.

According to the above-described configuration, when the relay 4 is inserted between a support wall 13 and the connecting portion 21 of the busbar 2, the relay 4 is guided by the curved surface 27 of the busbar 2, and can thus be easily inserted. Accordingly, similar to Embodiment 1, the relay 4 can be easily installed in the electrical junction box 1.

The embodiments disclosed herein are illustrative in all respects, and are not to be construed as limiting. The scope of the present disclosure is defined by the claims rather than the above-described meaning, and the meaning equivalent to the claims and all modifications within the claims are intended to be included.

What is claimed is:

1. An electrical junction box comprising:
   a container;
   a relay that is installed on an outer surface of the container;
   a busbar having a body portion and a connecting portion, the body portion is disposed on an under surface of the container and the connecting portion that extends through the container so as to protrude from the outer surface of the container, wherein the connecting portion is connected to the relay; and
   a support wall that protrudes from the outer surface of the container, is provided opposite to the connecting portion of the busbar, and supports the relay,
   wherein the relay is interposed between the connecting portion of the busbar and the support wall, and
   the connecting portion of the busbar has a guide portion configured to guide insertion of the relay between the busbar and the support wall.

2. The electrical junction box according to claim 1, wherein the guide portion is a curved surface formed by curving a protruding end of the connecting portion of the busbar to a side opposite to the support wall.

3. The electrical junction box according to claim 2, wherein
   the body portion is elongated in one direction; and
   the connecting portion is contiguous with one end portion of the body portion, and
   another end portion of the body portion has an elongated hole that is elongated in the one direction.

4. The electrical junction box according to claim 2, wherein the busbar has a thickness of 1 mm or more.

5. The electrical junction box according to claim 1, wherein the guide portion is an inclined surface that is formed at a protruding end of the connecting portion of the busbar, and is inclined such that a distance to the support wall increases toward the protruding end.

6. The electrical junction box according to claim 5, wherein the
   body portion is elongated in one direction; and
   the connecting portion is contiguous with one end portion of the body portion, and
   another end portion of the body portion has an elongated hole that is elongated in the one direction.

7. The electrical junction box according to claim 5, wherein the busbar has a thickness of 1 mm or more.

8. The electrical junction box according to claim 1, wherein the
   body portion that is elongated in one direction; and
   the connecting portion is contiguous with one end portion of the body portion, and
   another end portion of the body portion has an elongated hole that is elongated in the one direction.

9. The electrical junction box according to claim 8, wherein the busbar has a thickness of 1 mm or more.

10. The electrical junction box according to claim 1, wherein the busbar has a thickness of 1 mm or more.

\* \* \* \* \*